«12» United States Patent  
Wang

(10) Patent No.: US 8,217,919 B2  
(45) Date of Patent: Jul. 10, 2012

(54) STYLUS RETAINING AND RELEASING MECHANISM

(75) Inventor: Ming-Liang Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 340 days.

(21) Appl. No.: 12/576,658

(22) Filed: Oct. 9, 2009

(65) Prior Publication Data

US 2010/0231557 A1  Sep. 16, 2010

(30) Foreign Application Priority Data

Mar. 16, 2009 (CN) .......................... 2009 1 0300888

(51) Int. Cl.  
*G06F 3/033* (2006.01)  
*G06F 1/16* (2006.01)

(52) U.S. Cl. ..................................... 345/179; 371/679.3

(58) Field of Classification Search .................. 345/179; 312/223.2; 178/18.01–19.07; 361/679.3, 361/679.58  
See application file for complete search history.

(56) References Cited

U.S. PATENT DOCUMENTS

| 5,422,442 A | * | 6/1995 | Gouda et al. | ................ 178/19.01 |
| 6,129,430 A | * | 10/2000 | Wu | ............................. 312/223.2 |
| 2002/0003532 A1 | * | 1/2002 | Huat | ............................. 345/179 |

* cited by examiner

*Primary Examiner* — Amr Awad  
*Assistant Examiner* — Kenneth Bukowski  
(74) *Attorney, Agent, or Firm* — Altis Law Group, Inc.

(57) ABSTRACT

The stylus retaining and releasing mechanism includes a housing, a push button and an eject piece. The housing includes a first sidewall, a second sidewall connecting with the first sidewall and a stylus assembling portion disposed on the second sidewall. The first sidewall defines an assembling hole therethrough configured for inserting or removing the stylus. The second sidewall defines a button hole therethrough. The stylus assembling portion defines an axial receiving hole therethrough communicating and being coaxial with the assembling hole to receive the stylus therein. The push button is elastically assembled to the button hole of the second sidewall to releasably lock the stylus. The eject piece fixed to the second sidewall and configured to provide a elastic pushing force to eject the stylus out as the push button is pressed.

12 Claims, 6 Drawing Sheets

STYLUS RETAINING AND RELEASING MECHANISM

BACKGROUND

1. Technical Field

The exemplary disclosure generally relates to a stylus retaining and releasing mechanism, and, particularly, to a stylus retaining and releasing mechanism for detachably mounting a stylus to a portable electronic device.

2. Description of Related Art

Portable electronic devices, such as palm-top computers, hand-held computers, laptop computers, mobile phones and personal digital assistants (PDAs), have become increasingly popular. Many of these portable electronic devices include a stylus or a touch pen which can be utilized by a user to input information into the electronic device and/or to select menu options or otherwise navigate through a touch control graphical user interfaces of an operating system or the current software application.

Generally, the stylus is either clipped to the outer housing of a given portable electronic device or stored inside the housing thereof. Clipping the stylus to the outside of the housing provides convenient access to the stylus but also carries the disadvantage that the stylus may be easily dislodged from the clip by inadvertent contact with objects, such as the inner surfaces of a carrying case or other objects in the carrying case. Storing the stylus inside the housing provides more security to the stylus but suffers from the disadvantage that the user must take additional steps in order to release the stylus from its place of storage.

Therefore, there is room for improvement within the art.

BRIEF DESCRIPTION OF THE DRAWINGS

Many aspects of the exemplary stylus retaining and releasing mechanism can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
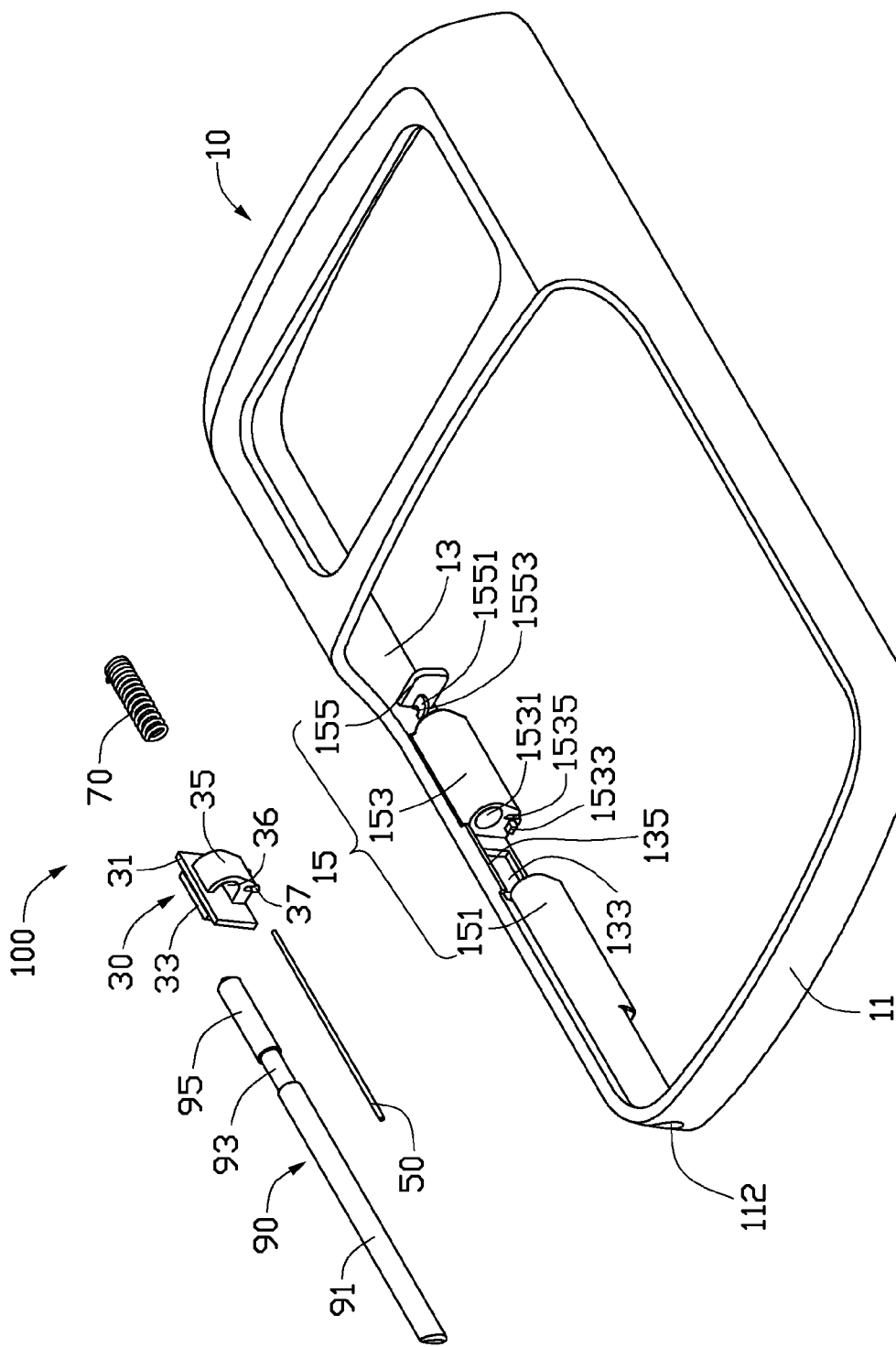
FIG. 1 shows an exploded, perspective view of a stylus retaining and releasing mechanism, according to an exemplary embodiment.
Figure 2:
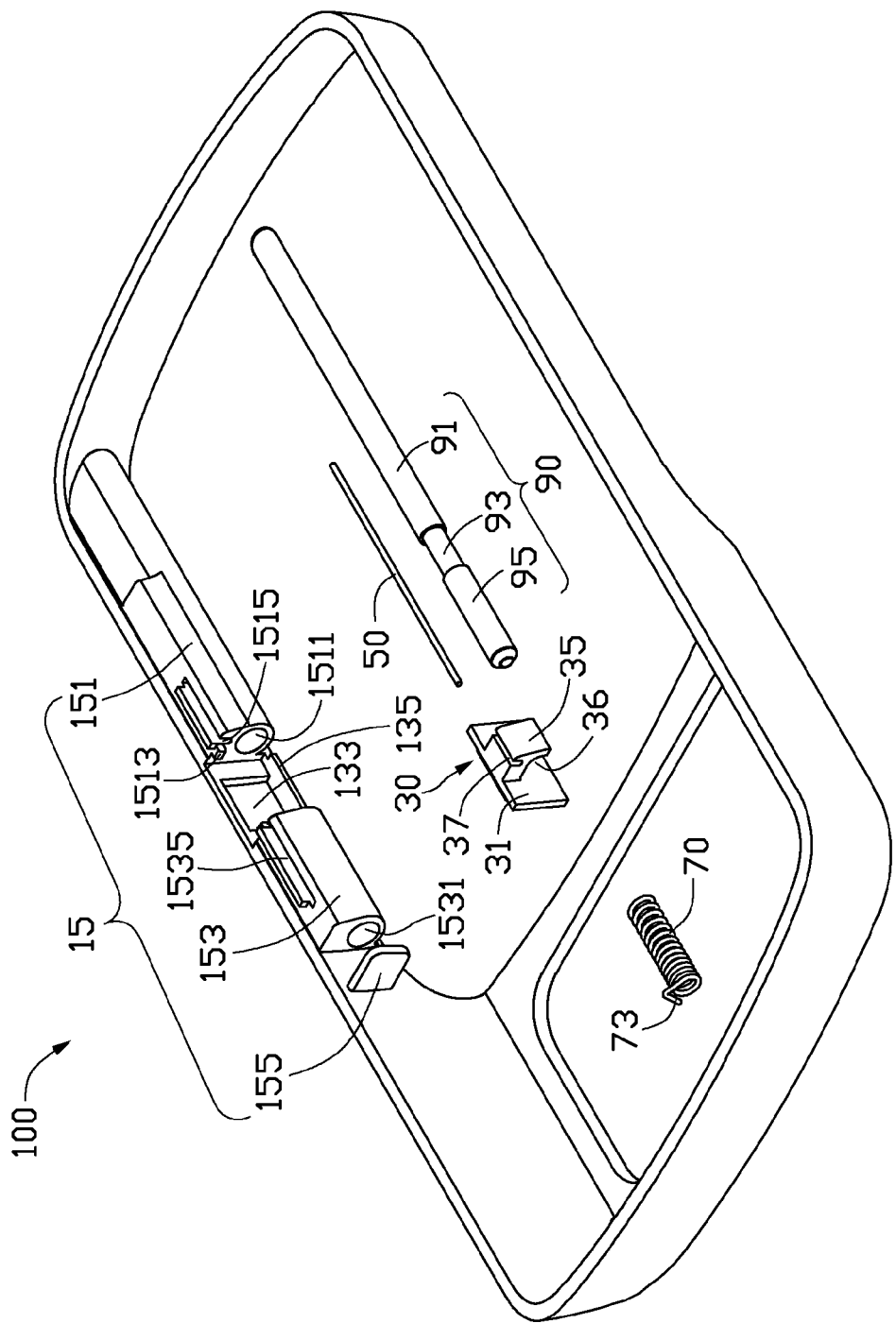
FIG. 2 is similar to FIG. 1, but viewed from another aspect.

FIG. 1 and FIG. 2 show an exemplary stylus retaining and releasing mechanism 100 configured to retain and release a stylus 90 therein. The stylus 90 is substantially cylindrical shape and includes a head portion 91, an opposite end portion 95 and a substantially annular latching groove 93 recessed in the peripheral surface thereof.

The stylus retaining and releasing mechanism 100 includes a housing 10, a push button 30, an elastic piece 50 and an eject piece 70. The housing 10 can be a shell of a portable electronic device such as mobile phone, palm-top computer, hand-held computer, laptop computer, PDA, etc. The housing 10 includes a first sidewall 11, a second sidewall 13 connecting with the one end of the first sidewall 11, and a stylus assembling portion 15 disposed on an inner surface of the second sidewall 13. The first sidewall 11 defines an assembling hole 112 therethrough adjacent to the first sidewall 11 and the second sidewall 13 for inserting or removing the stylus 90. The second sidewall 13 defines a button hole 133 therethrough for assembling the push button 30 therein. A guiding board 135 protrudes from a lateral margin of the inner surface of the second sidewall 13 adjacent to the button hole 133 and is configured to guide and resist the push button 30 assembled within the button hole 133.

The stylus assembling portion 15 includes a first assembling portion 151, a second portion 153 and a fixing pedestal 155 positioned on the inner surface of the second sidewall 13 of the housing 10 corresponding to and being coaxial with the assembling hole 112. The first assembling portion 151 and the second assembling portion 153 protrude from the inner surface of the second sidewall 13 coaxially and disposed at opposite sides of the button hole 133 respectively. A distance between the first assembling portion 151 and the second assembling portion 153 is substantially the same as the axial length of the latching groove 93 of the stylus. The first assembling portion 151, the second assembling portion 153, the guiding board 135 and the second sidewall 13 form a receiving space (not labeled) together to accommodate the push button 30 therein. In the exemplary embodiment, the first assembling portion 151 is hollow, and disposed on the second sidewall 13 adjacent to the assembling hole 112. An axial length of the first assembling portion 151 is substantially the same as the length of the head portion 91 between the distal end thereof and the latching groove 93. The first assembling portion 151 defines an axial receiving hole 1511 therethrough communicating and coaxial with the assembling hole 112. An end cross section of the first assembling portion 151 which is adjacent to the button hole 133 defines a resisting block 1513 protruding therefrom and an assembling groove 1515 recessed therein.

The second assembling portion 153 defines an axial accommodating hole 1531 therethrough being coaxial with the assembling hole 112 and the axial receiving hole 1511. The axial accommodating hole 1531 is configured to accommodate the end portion 95 of the stylus 90 therein. An end cross section of the second assembling portion 153 adjacent to the button hole 133 defines a resisting block 1533 protruding therefrom and a bar shaped assembling groove 1535 recessed therein opposite to the corresponding resisting block 1513 and the assembling groove 1515 respectively.

The fixing pedestal 155 protrudes from the second sidewall 13 adjacent to the second assembling portion 153 away from the first sidewall 11. The fixing pedestal 155 defines a fixing portion 1551 protruding therefrom toward the second assembling portion 153. A fixing hole 1553 is defined through the fixing portion 1551.

The push button 30 includes a base body 31, a pressing portion 33 and a releasing portion 35. The push button 30 is elastically assembled and accommodated within the receiving space formed by the first assembling portion 151, the second assembling portion 153, the guiding board 135 and the second sidewall 13 together. The base body 31 is for being assembled within the receiving space. The pressing portion 33 protrudes from a middle portion of one surface of the base body 31, and is configured for being accommodated within and exposed through the button hole 133. The releasing portion 35 is substantially semi-circular arc shape, and protrudes and extends from an opposite surface of the base body 31. The releasing portion 35 and the base body 31 cooperatively form an accommodating space 36. The releasing portion 35 includes an assembling slot 37 axially recessed therein parallel to the base body 31 and the accommodating space 36.

The elastic piece 50 may be a shaped spring wire or a linear spring assembled between the first assembling portion 151 and the second assembling portion 153 to elastically assemble the push button 30 to the housing 10 and provide an elastic force resisting against the push button 30. The two ends of elastic piece 50 are assembled within the assembling groove 1515 of the first assembling portion 151 and the assembling groove 1535 of the second assembling portion 153 respectively.

The eject piece 70 may be an elastic piece such as a coiled spring. One end of the eject piece 70 is bent to form a fixing end 73 configured to be fixed to or latched into the corresponding fixing hole 1553. The opposite end of the eject piece 70 is inserted into the axial accommodating hole 1531 of the second assembling portion 153.

Figure 3:
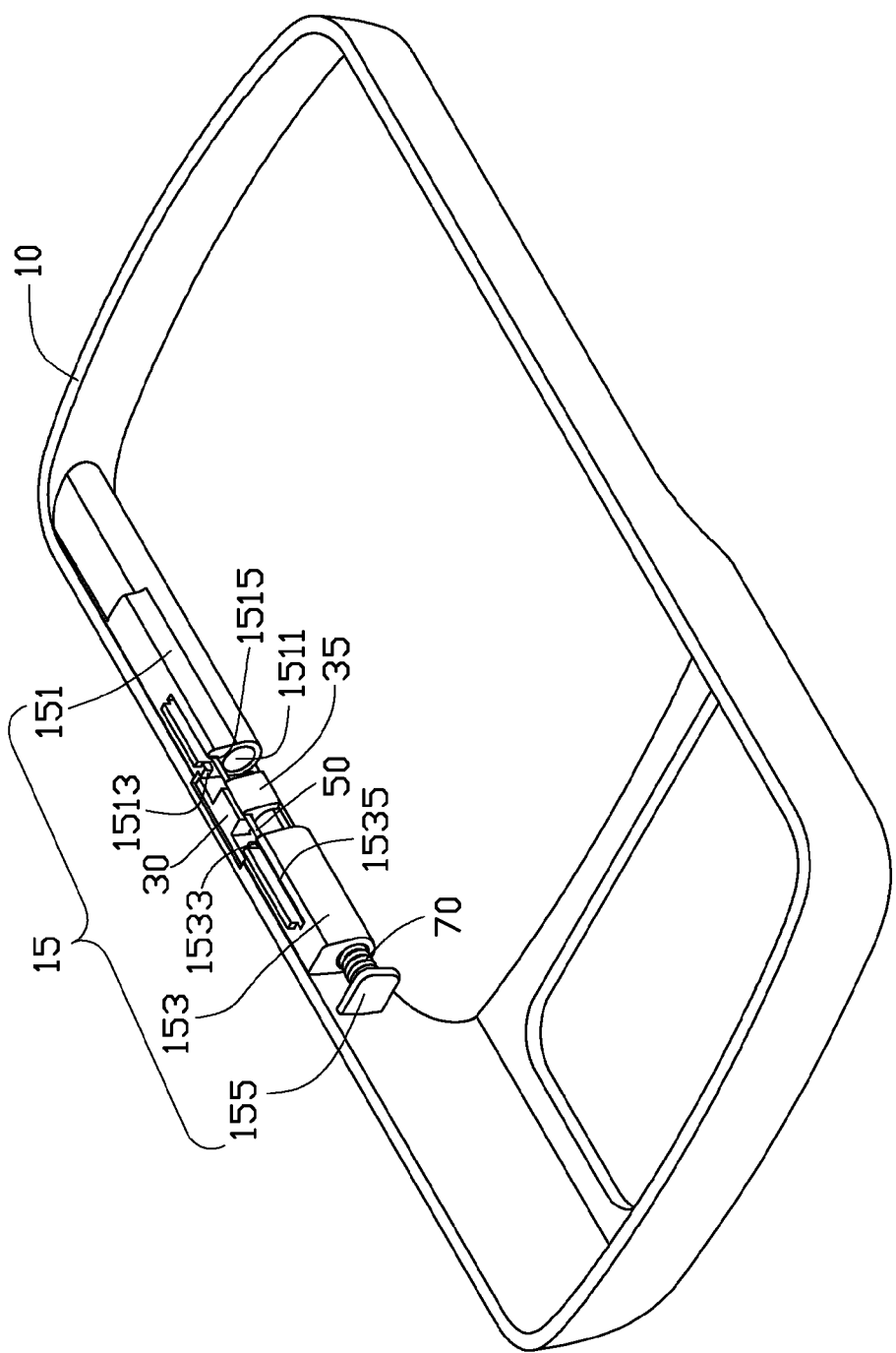
FIG. 3 shows an assembled perspective view of the stylus retaining and releasing mechanism of FIG. 2.
Figure 4:
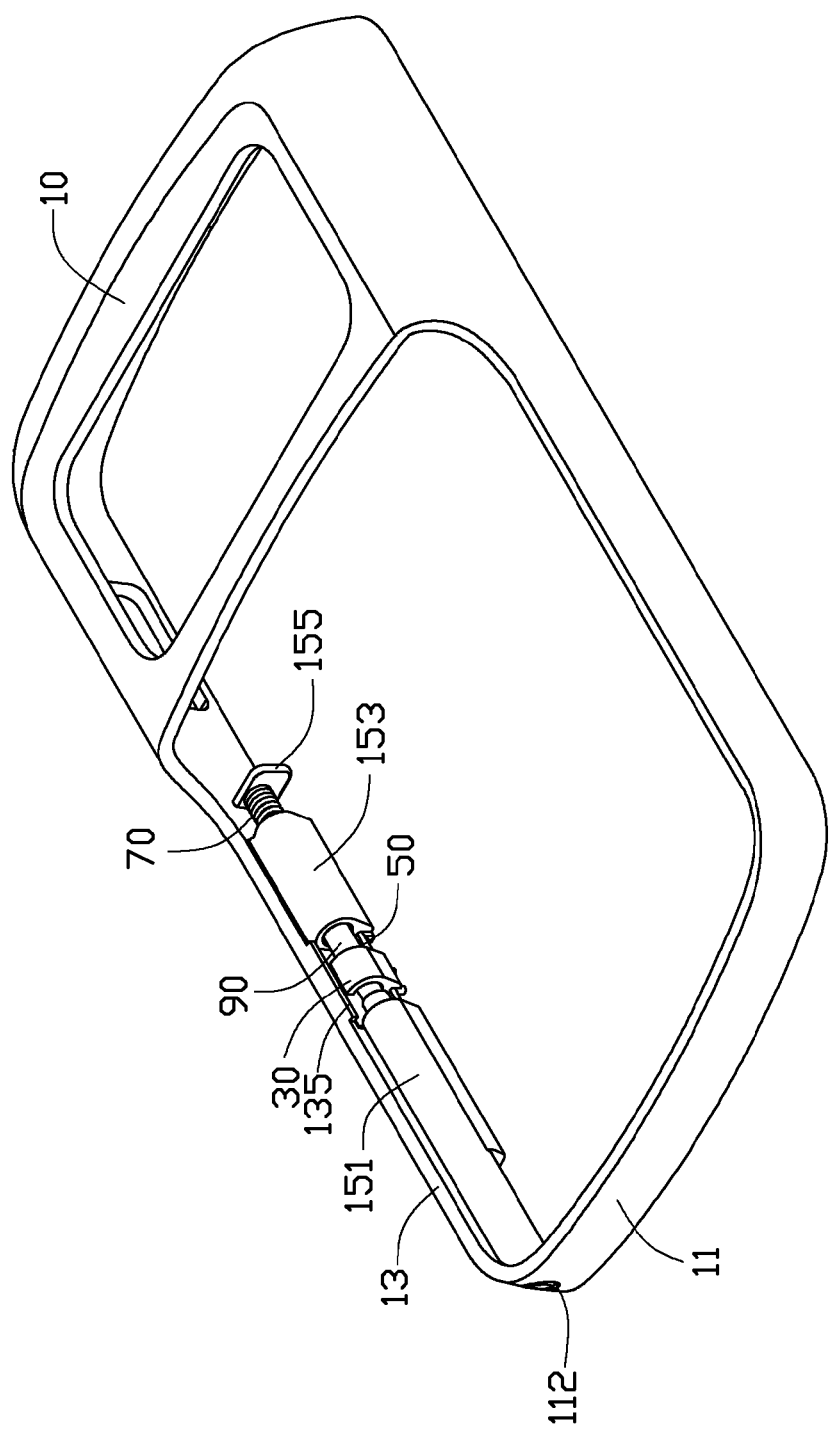
FIG. 4 is similar to FIG. 3, but viewed from another aspect.

Also referring to the FIG. 3 and FIG. 4, in assembly, the push button 30 is assembled within the receiving space formed by the first assembling portion 151, the second assembling portion 153, the guiding board 135 and the second sidewall 13 together. The pressing portion 33 is exposed from the button hole 133. The base body 31 resists on the guiding board 135, with two opposite ends thereof being resisted and latched between the corresponding resisting blocks 1513, 1533 respectively. The releasing portion 35 is accommodated between the first assembling portion 151 and the second assembling portion 153, with the accommodating space 36 being coaxial with the axial receiving hole 1511 of the first assembling portion 151 and the axial accommodating hole 1531 of the second assembling portion 153. The elastic piece 50 extends through the assembling slot 37 of the push button 30, with two ends thereof latching with the corresponding assembling grooves 1515, 1535 of the first assembling portion 151 and the second assembling portion 153 respectively. Thus, the push button 30 is elastically assembled between the first assembling portion 151 and the second assembling portion 153. The fixing end 73 of the eject piece 70 is fixed to the fixing portion 1551 of the fixing pedestal 155. The opposite end of the eject piece 70 is inserted into the axial accommodating hole 1531 of the second assembling portion 153.

Figure 5:
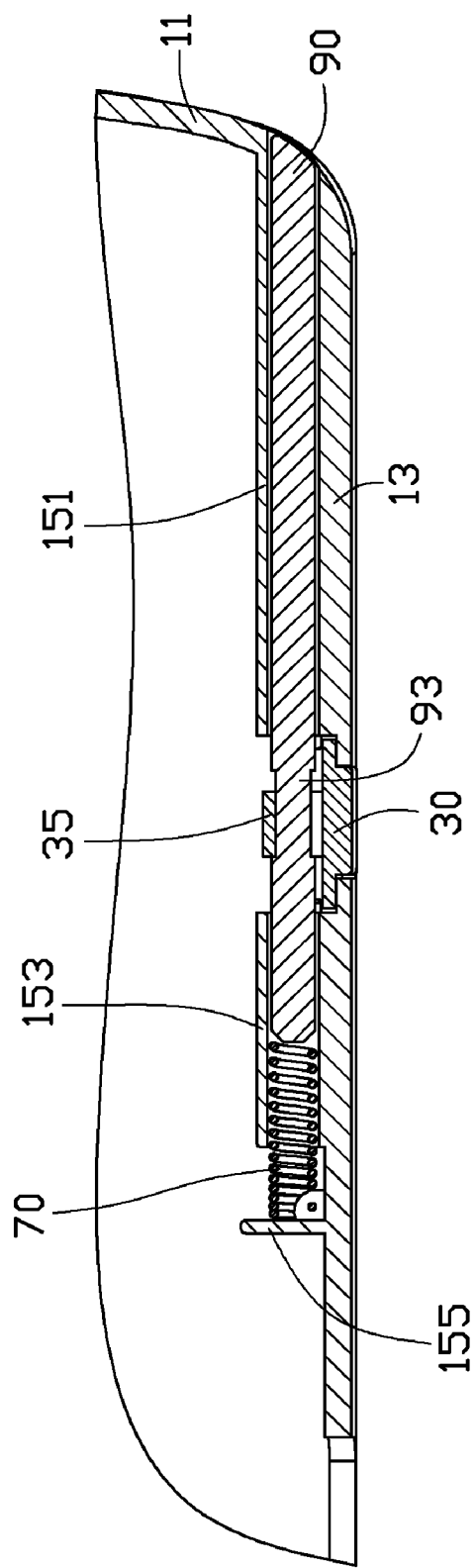
FIG. 5 shows a cross-sectional view of the stylus retaining and releasing mechanism, wherein the stylus is retained within the stylus retaining and releasing mechanism.
Figure 6:
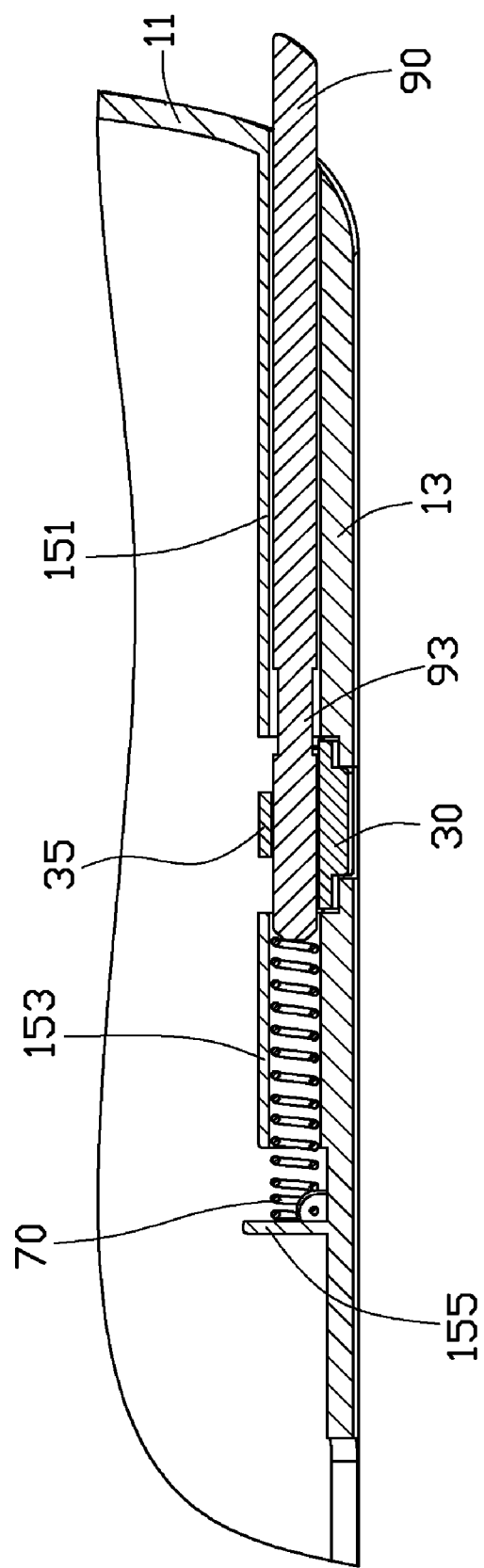
FIG. 6 shows a cross-sectional view of the stylus retaining and releasing mechanism, wherein the stylus is released with one end of the stylus partially exposing therefrom.

Also referring to FIG. 4, FIG. 5 and FIG. 6, when inserting the stylus 90 into the stylus retaining and releasing mechanism 100, the end portion 95 of the stylus 90 passes through the assembling hole 112 of the first sidewall 11, the axial receiving hole 1511 of the first assembling portion 151, the accommodating space 36 of the push button 30, and is inserted into and accommodated within the axial accommodating hole 1531 of the second assembling portion 153. Pushing the head portion 91 of the stylus 90 toward the fixing pedestal 155 pushes and compresses the eject piece 70 until the latching groove 93 of the stylus 90 enters the accommodating space 36 of the push button 30. The releasing portion 35 of the button 30 is elastically resisted by the elastic piece 50 and slides toward the stylus 90 along the guiding board 135, and latches into the latching groove 93 of the stylus 90 simultaneously. Thus, the head portion 91, the latching groove 93 and the end portion 95 of the stylus 90 are accommodated within the axial receiving hole 1511 of the first assembling portion 151, the accommodating space 36 of the push button 30, and the axial accommodating hole 1531 of the second assembling portion 153 respectively.

When removing the stylus 90 from the stylus retaining and releasing mechanism 100, the push button 30 is pressed to urge the releasing portion 35 of the button 30 to depart from latching groove 90 of the stylus 90. The eject piece 70 is released to push the end portion 95 of the stylus 90 toward the assembling hole 112, then, the head portion 91 of the stylus 90 is pushed to protrude out of the assembling hole 112.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stylus retaining and releasing mechanism configured to retain and release a stylus assembled therein, comprising:
    a housing comprising:
        a first sidewall defining an assembling hole therethrough configured for inserting or removing the stylus,
        a second sidewall connecting with one end of the first sidewall and defining a button hole therethrough; and
        a stylus assembling portion comprising a first assembling portion disposed on an inner surface of the second sidewall adjacent to the assembling hole, the first assembling portion defining an axial receiving hole therethrough communicating and being coaxial with the assembling hole to receive the stylus therein;
    a push button elastically assembled to the second sidewall corresponding to and exposing from the button hole and configured to lock the stylus in position, the push button including a releasing portion, the releasing portion of the push button including an assembling slot axial recessed therein;
    an elastic piece penetrating through the assembling slot of the push button, with two ends thereof fixed to the housing for providing an elastic force resisting against the push button; and
    an eject piece fixed to the housing and configured to push the stylus out as the push button being released.

2. The stylus retaining and releasing mechanism as claimed in claim 1, wherein the push button includes a base body, and a pressing portion, the pressing portion and the releasing portion are disposed on the two opposite surfaces of the base body, the releasing portion forms an accommodating space with the base body together; the stylus is partially accommodated within the accommodating space and locked with the releasing portion of the button.

3. The stylus retaining and releasing mechanism as claimed in claim 2, wherein the stylus assembling portion further includes a second assembling portion disposed on the two sides of the button hole of the second sidewall with first assembling portion respectively; the second assembling defines an axial accommodating hole therethrough coaxial with the assembling hole and the axial receiving hole.

4. The stylus retaining and releasing mechanism as claimed in claim 3, wherein the two opposite end cross sections of the first and second assembling portions each defines a resisting block and an assembling groove recessed therein; the two ends of the elastic piece are elastically latched with the corresponding two assembling grooves respectively; the two ends of the base body of the button are assembled to the corresponding resisting blocks of the first and second assembling portions respectively.

5. The stylus retaining and releasing mechanism as claimed in claim 3, wherein the second sidewall defines a guiding board protruding from the inner surface thereof adjacent to the button hole; the base body of the push button resists on the guiding board.

6. The stylus retaining and releasing mechanism as claimed in claim 4, wherein the stylus assembling portion further includes a fixing pedestal disposed on the second sidewall adjacent to the second assembling portion and being coaxial with the first and second assembling portions; the fixing pedestal defines a fixing portion protruding therefrom toward the second assembling portion, the eject piece includes a fixing end fixed to the fixing portion of the fixing pedestal, the opposite end of the eject piece is accommodated within the axial accommodating hole of the second assembling portion.

7. A stylus retaining and releasing mechanism comprising:
   a stylus having an annular latching groove;
   a first sidewall defining an assembling hole therethrough configured for inserting or removing the stylus,
   a second sidewall connecting with the first sidewall and defining a button hole therethrough; and
   a first assembling portion and a second assembling portion disposed on the inner surface of the second sidewall and positioned at two sides of the button hole, the first assembling portion defining an axial receiving hole therethrough, the second assembling portion defining an axial accommodating hole, the axial receiving hole and the accommodating hole communicating and being coaxial with the assembling hole to receive the stylus therein, a fixing pedestal protrudes from the second sidewall adjacent to the second assembling portion and far away from the first assembling portion;
   a push button elastically assembled within the button hole of the second sidewall, the push button including a semi-circular arc shape releasing portion to releasably lock the annular latching groove of the stylus within the first assembling portion and the second assembling portion; and an eject piece, a first end exposed from the accommodating hole of the second assembling portion and fixed to the fixing pedestal, and a second end received in the axial accommodating hole and configured to provide an elastic force resisting against eject the stylus out as the push button is pressed;
   wherein the releasing portion of the push button includes an assembling slot axial recessed therein, an elastic piece penetrates through the assembling slot of the push button, with two ends thereof fixed to the housing for providing an elastic force resisting against the push button.

8. The stylus retaining and releasing mechanism as claimed in claim 7, wherein the fixing pedestal has a fixing portion protruding therefrom, the first end of the eject piece fixed to the fixing portion of the fixing pedestal.

9. The stylus retaining and releasing mechanism as claimed in claim 8, wherein the fixing portion of the fixing pedestal defines a fixing hole there through; the eject piece is a coiled spring having a fixing end configured to be fixed to or latched into the corresponding fixing hole of the fixing portion of the fixing pedestal.

10. The stylus retaining and releasing mechanism as claimed in claim 8, wherein the stylus includes a head portion, an opposite end portion and a latching groove recessed in the peripheral surface thereof; the push button includes a base body, and a pressing portion, the pressing portion and the releasing portion are disposed on the two opposite surfaces of the base body, the releasing portion forms an accommodating space with the base body together; the latching groove of the stylus is accommodated within the accommodating space and latched with the releasing portion of the button.

11. The stylus retaining and releasing mechanism as claimed in claim 10, wherein the elastic piece is a spring elastically assembled to the push button and fixed to the stylus assembling portion to provide an elastic force resisting against the push button.

12. The stylus retaining and releasing mechanism as claimed in claim 10, wherein a distance between the first assembling portion and the second assembling portion is substantially the same as the axial length of the latching groove of the stylus.

* * * * *